United States Patent
Lenke et al.

[11] Patent Number: 5,658,672
[45] Date of Patent: Aug. 19, 1997

[54] IN-MOLD COATING COMPOSITION

[75] Inventors: Gerd M. Lenke, Massillon; Earl G. Melby, Uniontown; H. William Cocain, Cuyahoga Falls, all of Ohio

[73] Assignee: GenCorp Inc., Fairlawn, Ohio

[21] Appl. No.: 438,117

[22] Filed: May 8, 1995

[51] Int. Cl.$^6$ .................................................. B32B 27/40
[52] U.S. Cl. ............................ 428/423.1; 428/425.6; 428/522; 525/127; 525/453; 525/454; 525/455; 525/457
[58] Field of Search ................ 428/423.1, 425.6, 428/522; 525/127, 453, 454, 455, 457

[56]  References Cited

U.S. PATENT DOCUMENTS

| | | | |
|---|---|---|---|
| 4,242,415 | 12/1980 | Feltzin et al. | 428/412 |
| 4,293,659 | 10/1981 | Svoboda | 525/28 |
| 4,356,230 | 10/1982 | Emanuel et al. | 428/290 |
| 4,366,109 | 12/1982 | Svoboda | 525/28 |
| 4,422,996 | 12/1983 | Navin et al. | 264/255 |
| 4,425,468 | 1/1984 | Makhlouf et al. | 524/710 |
| 4,552,913 | 11/1985 | Wolfe et al. | 524/240 |
| 4,603,181 | 7/1986 | Nishino et al. | 525/528 |
| 4,607,084 | 8/1986 | Morris | 525/454 |
| 4,649,062 | 3/1987 | Kosierek et al. | 427/54.1 |
| 4,717,739 | 1/1988 | Chevreux et al. | 522/79 |
| 4,800,123 | 1/1989 | Boeckeler | 428/424.2 |
| 4,873,274 | 10/1989 | Cummings et al. | 523/500 |
| 5,017,433 | 5/1991 | Chevreux et al. | 428/425.6 |
| 5,145,927 | 9/1992 | Suzuki et al. | 526/301 |
| 5,164,127 | 11/1992 | Boeckeler | 264/22 |

OTHER PUBLICATIONS

Enclyclopedia of Polymer Science and Engineering, vol. 13, Polyurethanes, pp. 288–295 1988.

*Primary Examiner*—Paul J. Thibodeau
*Assistant Examiner*—Mary Critharis
*Attorney, Agent, or Firm*—Robert F. Rywalski; Daniel J. Hudak

[57]  ABSTRACT

A one-part, solvent free in-mold coating composition exhibiting good hardness, good crack resistance, and good adhesion to fiber reinforced plastic substrates includes a blend of a urethane polyacrylate compound having three or more (meth)acrylate groups, a urethane diacrylate or urethane divinyl compound, one or more adhesion promoters, and one or more ethylenically unsaturated copolymerizable monomers.

13 Claims, No Drawings

IN-MOLD COATING COMPOSITION

FIELD OF THE INVENTION

The present invention relates to a thermosettable in-mold coating composition for molded plastic substrates. More particularly, the invention relates to a laminate of an in-mold coating composition on a fiber reinforced plastic (FRP) substrate which coating cures to form an exceptionally hard layer on the FRP substrate with good adhesion thereto.

BACKGROUND OF THE INVENTION

A well known problem with compression molded articles is that the surfaces thereof are aesthetically undesirable because of defects such as pits, porosity, sink marks and micro cracks. Various in-mold coating compositions have been developed to coat and cover surface defects of compression molded articles to provide a smooth high quality surface having an aesthetically appealing appearance. One part thermosetting in-mold coating compositions, which cure upon exposure to elevated temperatures, are preferred. Examples of such compositions generally include blocked polyisocyanates which react with a polyol upon unblocking of the isocyanate groups, unsaturated polyesters and vinyl ester resins which react with an ethylenically unsaturated monomer, such as styrene, via free radically initiated addition polymerization, polyurethane precursors having terminal ethylenically unsaturated sites which react with an ethylenically unsaturated addition monomer, and the like.

SUMMARY OF THE INVENTION

The invention provides a one-part, thermosettable liquid and solvent free in-mold coating composition comprising a blend of urethane acrylate compounds, including at least one urethane diacrylate or urethane divinyl compound and at least one urethane polyacrylate compound having three or more terminal acrylate functional groups. The composition also includes at least one copolymerizable mono-ethylenically unsaturated monomer, and preferably at least one adhesion promoter, and a suitable free radical initiator such as a peroxide or azo initiator.

In accordance with a preferred aspect of the invention, the in-mold coating composition can be essentially free of opacifying agents and pigments to provide a clear, non-discoloring coating for FRP substrates.

BRIEF DESCRIPTION OF DRAWINGS

The drawing is a cross-sectional view of an in-mold coated article according to the present invention showing an in-mold coating composition on a fiber reinforced plastic substrate.

DESCRIPTION OF THE PREFERRED EMBODIMENTS

The urethane polyacrylates, defined as containing three or more terminal functional i.e., (meth)acrylate groups per molecule, can be prepared by reacting an organic polyisocyanate having three or more isocyanate groups, and optionally but preferably with a polyol, and with a hydroxyalkyl (meth)acrylate.

Useful organic polyisocyanates having three or more isocyanate groups are those made with isocyanate compounds having from 2 to 10 isocyanate groups, preferably 2, and from about 2 to about 40 or 50 carbon atoms in the connecting hydrocarbon group. Such isocyanate compounds include aliphatic polyisocyanates, cycloaliphatic polyisocyanates, as well as aliphatic substituted aromatic or aromatic substituted aliphatic polyisocyanates, with aliphatic and cycloaliphatic polyisocyanates being preferred, especially when clear, non-discoloring compositions are desired.

Suitable aliphatic polyisocyanates include ethylene diisocyanate, 1,2-diisocyanatopropane, 1,3-diisocyanatopropane, 1,4-tetramethylene diisocyanate, 1,6-hexamethylene diisocyanate, 2,4,4-trimethyl hexamethylene diisocyanate, ω,ω"-diisocyanatodipropyl ether, isophorone diisocyanate, and the like. Cycloaliphatic polyisocyanates which can be used include dicyclohexyl-4,4"-methane diisocyanate, bis(isocyanatomethyl) cyclohexane, bis (isocyanatoethyl) cyclohexane, 1,4-methylene bis (cyclohexylisocyanate) and the like. Suitable aromatic polyisocyanates include p- and m-tetramethyl xylene diisocyanate, 4,4-methylene diphenyl isocyanate (MDI) or oligomers thereof (polymeric MDI), p- and m-phenylene diisocyanate, 2,4- and/or 2,6-toluene diisocyanate (TDI), 1,3- or 1,4-bis(1-isocyanato-1-methylethyl)benzene (TMXDI), and the like.

Preferred polyisocyanates containing 3 or more isocyanate groups include aliphatic or cycloaliphatic diisocyanates having from 4 to 12 carbon atoms, which are reacted in various ways to form one or more isocyanurate rings. One such way is to trimerize the diisocyanates to form a single isocyanurate ring, e.g.:

3 OCN—R—NCO ⟶

Formula I

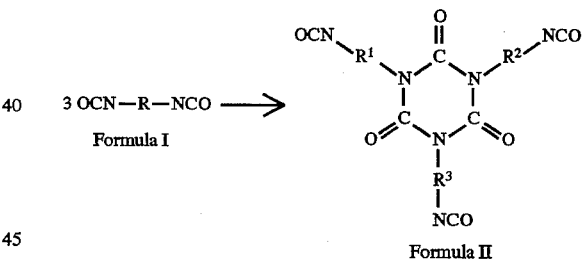

Formula II where $R^1$, $R^2$, and $R^3$, independently, is said aliphatic or cycloaliphatic group such as $C_2$ to $C_{12}$ alkylene.

The trimerization of the isocyanate groups may be catalyzed by a variety of catalysts known in the art. Examples are quaternary ammonium salts such as those sold by Air Products under the trade name of DABCO-TMR,—TMI-1, TMR-2, etc. Other useful catalysts are ethyl=amine, phosphines such as trimethyl phosphine, and alkoxides such as sodium methoxide.

The triisocyanate of Formula II can react further with two diisocyanates (Formula I) yielding a tetraisocyanate with two isocyanurate rings, connected by any of the $R^1$, $R^2$, or $R^3$ groups. See Formula III wherein $R^4$ and $R^5$ is a $C_2$ to $C_{12}$ alkylene.

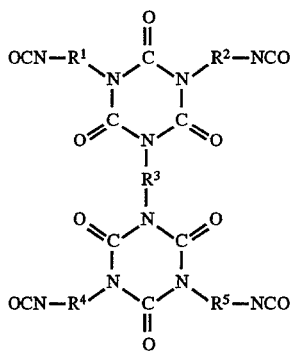

Formula III

In the same fashion, two or more diisocyanates (Formula I) can react with Formula III yielding three or more isocyanurate rings, etc., respectively, with five or more isocyanate groups, etc.

The above noted ring containing polyisocyanates including those shown in Formulas II and III, are often obtained as mixtures. Polyisocyanates of the biuret-type, such as Formula IV are also useful.

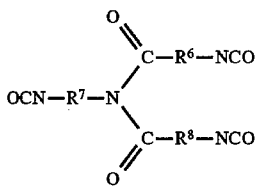

Formula IV where $R^6$, $R^7$ and $R^8$, independently, is an aliphatic or cycloaliphatic such as $C_2$ to $C_{12}$ alkylene.

Another class of isocyanates having three or more isocyanate groups are made by reacting diisocyanates with various polyols such as triol, tetrols, etc. For example, a triisocyanate resulting by reaction of trimethol propane with toluenediisocyanate is a product sold by Miles, i.e., Mondur CB.

Any of the above-noted polyisocyanates having three or more isocyanurate groups can be reacted with hydroxy-(meth)acrylate to form a polyfunctional urethane acrylate. However, the biuret-type triisocyanates are less preferred because they are thermally less stable than the aforementioned isocyanurate-type triisocyanates.

To increase the functionality of the above noted polyisocyanates having three or more isocyanate groups, they are reacted (or coupled) with various polyols such as triols, tetrols, etc. For example, if the above triisocyanurate ring (Formula II) is reacted with a triol such as trimethylol propane in a molar ratio of 3:1, a trisisocyanurate with six pendant isocyanate groups can be obtained, as represented by Formula V:

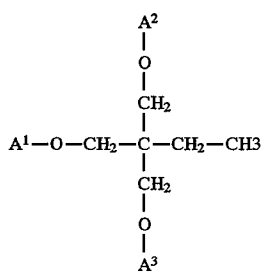

Formula V where $A^1$, $A^2$, and $A^3$, independently is a reacted Formula II compound, i.e.

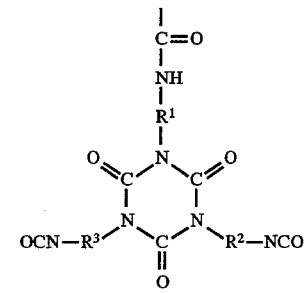

The organic polyols which can be used as coupling agents include aliphatic diols having from 2 to 8 carbon atoms, such as ethylene glycol, propylene glycol, diethylene glycol, dipropylene glycol, neopentyl glycol, and the like. Aliphatic polyols having from 3 to 6 hydroxyl groups are preferred, such as trimethylolmethane, trimethylolpropane, trimethylolethylene, pentaerythritol, dipentaerythritol, and the like. In addition to these diols, higher molecular weight polyols such as polypropylene ether polyols can be utilized as coupling agents.

Urethane polyacrylates having three or more terminal acrylate groups can be prepared as by reacting the above noted polyisocyanates, e.g., those shown in Formulas II, III, IV, or V, with a hydroxyalkyl (meth)acrylate, wherein the hydroxyalkyl moiety contains from about 2 to about 12 carbon atoms. Specific examples include hydroxyethyl acrylate, hydroxypropyl acrylate, hydroxybutyl acrylate, hydroxypentyl acrylate, hydroxyhexyl acrylate, hydroxyheptyl acrylate, hydroxyoctyl acrylate, and the like, and the corresponding methacrylates. Preferred hydroxy alkyl acrylates include hydroxyethyl acrylate, hydroxypropyl acrylate, and hydroxybutyl acrylate, and combinations thereof.

Suitable catalyst for promoting the reaction between the isocyanate radicals and the hydroxyl radicals are well known to the art and include various tin catalysts, such as dibutyltin dilaurate, stannous octoate, and the like.

Naturally, the hydroxyalkyl (meth)acrylate will react with the free isocyanate end groups of the polyisocyanate to form a compound having acrylate end groups. When the hydroxyalkyl acrylate is hydroxyethyl acrylate and the polyisocyanate is as set forth in Formula V, a structure is obtained as set forth in Formula VI.

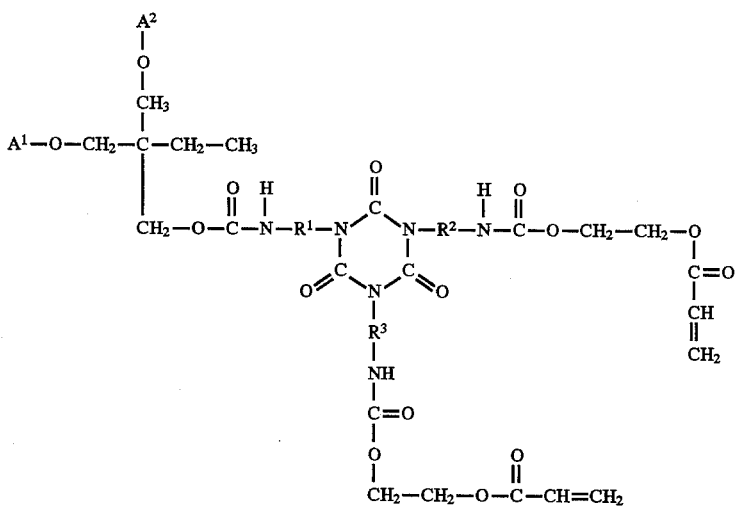

Formula VI where $A^1$ and $A^2$ is the above-noted trimerized isocyanate reacted with the hydroxyethyl acrylate, only one of which is shown in Formula B, and wherein $R^1$, $R^2$, and $R^3$ is an aliphatic group as noted above. Such a compound is a component of a commercially available product sold as EBECRYL® 8301 manufactured by RadCure of Smyrna, Ga. EBECRYL® 8301 is a blend of a diluent, which is (ethylene-/diethylene glycol) diacrylate (based on hydroxyethyl acrylate) mostly ethylene glycol diacrylate, and the above noted hexafunctional acrylate in a ratio of hexafunctional acrylate/diacrylate diluent of approximately 48/52 parts by weight.

Inasmuch as different types of polyisocyanates having three or more isocyanate groups can be utilized along with different types of polyols and hydroxyalkyl (meth)acrylates, a vast number of poly functional urethane acrylates having three or more acrylate end groups can be utilized.

The urethane diacrylates can be prepared by reacting a diisocyanate, preferably an aliphatic such as those set forth hereinabove, with a hydroxyalkyl (meth)acrylate such as also noted above. Alternatively, a polyurethane having two NCO end groups can be reacted with the hydroxylalkyl (meth)acrylate. The polyurethane can be made from alkylene diols, alkylene oxide diols, or alkylene ester diols having from 2 to about 50 carbon atoms, and desirably from 2 to 10 or 20 carbon atoms, either linear or preferably branched, and diisocyanates with an equal molar amount or slight excess of isocyanate to hydroxyl groups. Examples of suitable alkylene diols include ethylene glycol, propylene glycol, butylene glycol, and the like. Examples of suitable alkylene oxide diols include diethylene glycol and the like with specific alkylene oxide groups including ethylene oxide, propylene oxide, butylene oxide, and the like. Alkylene ester diols are those made from one or more diols having from 2 to 15 carbon atoms with one or more dicarboxylic acids having from 2 to 14 carbon atoms with examples of suitable alcohols including ethylene glycol, propylene glycol, 1,2 propylene glycol, and the like, with suitable acids including maleic acid, fumaric acid, succinic acid, adipic acid, terephthalic acid, phthalic acid and the like. An example of such a preferred aliphatic urethane diacrylate is EBECRYL 284, manufactured by RadCure, Smyrna, Ga., which is a blend of an (ethylene oxide/ diethylene oxide) urethane diacrylate, i.e., hydroxyethyl acrylate, and a diluent, hexane diol diacrylate; the weight ratio of polymer to diluent is approximately 84/16 by weight.

Alternate, but not as preferred routes of synthesis to form urethane diacrylates can also be utilized. For example, an alkyl (meth)acrylate having isocyanate end groups can be reacted with a dihydroxyl terminated compound to yield a urethane diacrylate as follows:

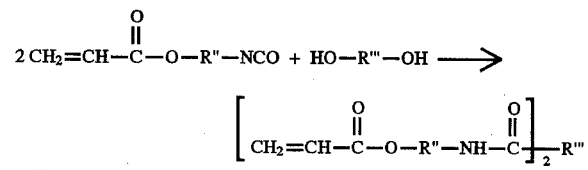

where R" is an alkylene having from 1 to 10 carbon atoms and R'" is an alkylene, an alkylene oxide, or an alkylene ester having from 2 to 20 carbon atoms such as those noted in the preceding paragraph. R'" may also contain urethane or urea linkages.

In lieu of the urethane diacrylates, urethane divinyl compounds can be utilized and include those derived from vinyl substituted monoisocyanate reacted with a dihydroxy compound in accordance with the following formula:

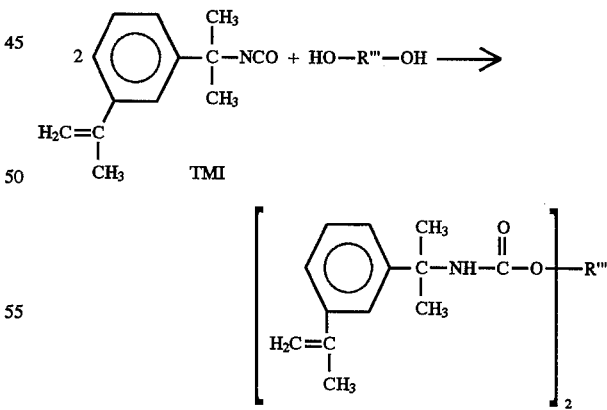

where R'" is as set forth above. Generally, the monoisocyanate is any isocyanate compound having a vinyl, as well as isocyanate end groups. The trunk (i.e., the non-isocyanate, non-vinyl portion) of the molecule may be a hydrocarbyl with from 3 to about 25 carbon atoms, optionally, also containing atoms such as oxygen, sulfur and/or nitrogen. Still another vinyl compound is isocyanato ethyl methacrylate.

A blend of one or more urethane diacrylates (or urethane divinyl compounds) and one or more polyfunctional urethane acrylates containing three or more terminal (meth) acrylic groups has been found to provide a highly desirable combination of properties including exceptional hardness, good crack resistance, exceptional adhesion to an FRP substrate, and good UV-light and hot water resistance. The mole ratio of diacrylate or divinyl urethane compounds to polyfunctional urethane acrylate compounds can be adjusted to specific applications to meet specific property requirements over a wide range. Generally, a higher mole ratio of polyfunctional to difunctional compounds results in higher surface hardness. Softer, more flexible or impact-and crack-resistant coatings are obtained with lower ratios of polyfunctional to difunctional compounds. Suitable mole ratios of the difunctional to polyfunctional compounds are generally from about 0.1 to about 50, or 100, desirably from about 0.15 to about 15, and preferably from about 0.2 to about 4.0.

Preferably, the in-mold coating compositions contain at least one adhesion promoter.

A preferred adhesion promoter is a mixture or blend of alkyl (meth)acrylate oligomers, preferably alkyl acrylate oligomers, and acrylate monomers. The oligomers generally have a number average molecular weight of from about 500 to about 15,000 and desirably from about 1,000 to about 5,000. The alkyl or ester portion of the acrylate generally has from 1 to 10 carbon atoms such as 2-ethylhexyl acrylate, butyl acrylate, ethyl acrylate, and the like. Generally, the amount of such acrylate oligomers in the adhesion promoter blend is from about 50 to about 80 percent by weight and desirably from about 60 to about 68 percent by weight with preferably a significant level of the oligomers being 2-ethylhexyl acrylate with smaller amounts of other short-chain alkyl acrylate oligomers. The acrylate monomer is the reaction product of an alkylene oxide having from 2 to 5 carbon atoms such as ethylene oxide with an unsaturated acid such as acrylic acid, methacrylic acid, and the like. The alkylene ether in turn can be reacted with other species to form ether linkages. One such species is a monofunctional long chain hydroxyl compound. An example of such a compound is set forth by Formula VII.

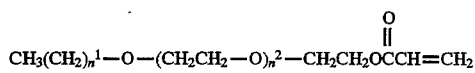

$$CH_3(CH_2)_{n^1}-O-(CH_2CH_2-O)_{n^2}-CH_2CH_2OCCH=CH_2$$

where $n^1$ is from about 5 to about 12 and desirably from about 6 to about 8 and $n^2$ is from about 0 to 6 and desirably from about 0 to 3. The amount of the monomer in the adhesion promoter blend is generally from about 20 to about 50 percent by weight and desirably from about 32 to about 40 percent by weight. Specific examples of such adhesion promoters are available from RadCure as RSX-92604 and as RSX-88221.

Also preferred as adhesion promoters are vinyl substituted monoisocyanates. The various monoisocyanates can be aliphatic, aromatic, or combinations thereof and generally contain a total of from about 4 to about 40 carbon atoms with from 4 to 10 carbon atoms being preferred. The vinyl group can be a vinyl group, per se, or be a vinyl group as contained in an acrylate or methacrylate. A typical example of such a compound is m-isopropenyl-α,α-dimethyl-benzyl isocyanate (m-TMI, sold by Cytec Industries, Inc.). If such isocyanate bearing monomers are used, preferably no monomers or other ingredients which contain groups reactive with isocyanates, such as hydroxyl or amino groups, etc., should be present in the coating formulations.

Still other adhesion promoters include various alkyl cyanoacrylates wherein the alkyl group has from 1–10 carbon atoms such as 2-2"-cyanoethyl acrylate.

The adhesion promoters can generally be utilized in amounts ranging up to about 50 parts by weight, more desirably from about 2 to 45 parts by weight, and preferably from about 4 to 35 parts by weight, per 100 parts by weight of the urethane diacrylate (divinyl) and polyfunctional urethane acrylate (three or more) compounds.

The in-mold coating compositions of the invention also include one or more ethylenically unsaturated copolymerizable monomers containing from about 2 to 20 carbon atoms. Examples include various vinyl substituted aromatics having from 8 to 12 or 15 carbon atoms such as styrene, alpha-methylstyrene, divinylbenzene, or vinyl toluene; various alkyl acrylates or methacrylates having from 1 to 8 or 12 carbon atoms in the ester group such as ethylacrylate, methylacrylate, propylacrylate, butylacrylate, or hexylacrylate and the corresponding methacrylates; various hydroxy alkyl (meth)acrylates wherein the alkyl group has a total of from 1 to 10 carbon atoms with specific examples including hydroxy ethyl acrylate, hydroxy propyl acrylate, hydroxy butyl acrylate, hydroxy ethyl methacrylate, hydroxy propyl methacrylate, hydroxy butyl methacrylate, and the like; various acrylate glycols having from 2 to 20 carbon atoms such as ethylene glycol diacrylate, or ethylene glycol dimethacrylate; various vinyl esters having a total of from 4 to 20 carbon atoms, such as vinylacetate; acrylonitrile, methacrylonitrile, and the like. Preferred comonomers include styrene, derivatives of styrene such as alpha-methylstyrene, lower molecular weight acrylates or methacrylates such as methyl methacrylate, and the hydroxy alkyl (meth)acrylates such as hydroxy propyl methacrylate, and the like. The amount of such monomers is generally from about 2 to about 50 or about 100 parts by weight, desirably from about 5 to about 40 parts by weight, and preferably from about 10 to about 35 parts by weight for every 100 parts by weight of the total amount of the one more polyfunctional urethane acrylates (three or more) and the one or more urethane diacrylates or urethane divinyl compounds. These monomers copolymerize with the polyfunctional or difunctional compounds as well as with the adhesion promoters via free radical initiated addition polymerization.

The in-mold coating compositions of the invention generally include one or more free radical initiators for addition polymerization. Suitable free radical initiators for use with the invention generally include any of the various known peroxide initiators, such as acetal peroxide, benzoyl peroxide, cumyl peroxide, tertiary-butyl peroxide, tertiary-butyl hydroperoxide, cumyl hydroperoxide, tertiary-butyl perbenzoate, and the like, and various azo-initiators such as 2,2"-azobisisobutyronitrile and the like. The initiator may be used in combination with a conventional accelerator such as cobalt octoate, zinc naphthanate, lead naphthanate, cobalt naphthanate, magnesium naphthanate, metal salts of linoleic acid, and the like. The initiators and accelerators can be used in conventional amounts which are effective for promoting free radically initiated addition polymerization at the desired cure temperature. Suitable amounts of initiator generally range from about 0.2 to about 8 parts and desirably from about 0.5 to about 5 parts by weight per 100 parts by weight of polymerizable ethylenically unsaturated monomers and oligomers.

Accelerators are also utilized in amounts of from about 0.01 to about 1 part and preferably from about 0.01 to about 0.5 parts by weight per 100 parts by weight of said polymerizable unsaturated monomers and oligomers. In order to prevent premature curing of the in-mold coating composition, it may be desirable to utilize small amounts of an inhibitor such as benzoquinone, which may be utilized in amounts, such as from about 0.01 to about 1 part, and preferably from about 0.01 to about 0.5 parts by weight, per 100 parts by weight of said polymerizable monomers and oligomers.

The thermosetting in-mold coating composition preferably includes one or more mold release agents, such as any of the various metal salts of fatty acids having at least 10 carbon atoms. Examples of suitable mold release agents include calcium stearate, zinc stearate, zinc palmitate, and the like. The mold release agent or combination of mold release agents can be utilized in amounts ranging from about 0.2 to about 5 parts by weight, and preferably from about 0.2 to about 2.5 parts by weight, per 100 parts by weight of said polymerizable monomers and oligomers.

The in-mold coating composition can optionally be compounded with other ingredients, such as antidegradants, ultraviolet absorbers, paraffin wax, thickening agents, colorants, fillers, and the like. These optional compounding ingredients should be used in amounts sufficient to provide desired results.

Optionally, opacifiers, such as talc or carbon black, pigments, colorants and the like can be used if desired. However, talc and other opacifiers can be used in amounts less than 30 parts or less than 20 parts, and preferably but substantially free thereof, such as less than 10, less than 5, or less than 2 parts by weight per 100 parts by weight of said polymerizable monomers and oligomers. If a clear coating is desired, the formulation is totally free of any opacifiers.

The in-mold coating compositions are preferably prepared by blending the polyfunctional urethane acrylate compound and the urethane diacrylate or urethane divinyl compound, then adding and blending the remaining components, such as the one or more adhesion promoters, ethylenically unsaturated comonomer, inhibitor, mold release agent, accelerator, and other additives or modifiers, with the initiator desirably added last. Solid ingredients such as the mold release agents, and a thickener (e.g., fumed silica), if utilized, should preferably be added after all of the other ingredients, except for the initiator, have been blended to a homogeneous mixture.

The composition of the invention is preferably utilized as an in-mold coating for molded plastic articles, especially fiber reinforced plastics (FRP). The FRP can be any desired plastic article substrate and can contain any type of desired fiber therein such as glass fibers, boron fibers, graphite fibers, carbon fibers, nylon fibers, and the like. The laminates or articles of the present invention are prepared according to any suitable method. For example, the FRP can be added to a curing press wherein generally under high pressure the FRP is molded into a desired shape and cured under heat to form a thermoset. The mold is then slightly opened above a desired portion thereof which is to be coated. The above noted in-mold coating composition of the present invention is then injected into the desired coating area portion, optionally under vacuum assist, and cured under heat. A portion of such an in-mold coated article 10 is shown in the drawing wherein the cured in-mold coating composition 30 is located on the fiber-reinforced plastic thermoset 20. Any of various in-mold coating processes may be used. Suitable in-mold coating techniques are described, for example, in U.S. Pat. No. 4,076,788 to Ditto, and U.S. Pat. No. 4,668,460 to Ongena, which are hereby incorporated by reference herein. The in-mold coating generally has a pencil hardness of at least 3H or 3.25H, desirably at least 3.5H, and preferably at least 4H, and even 5H.

The in-mold coating composition of the present invention are generally liquid and solvent free and can be used in the manufacture of various molded plastic articles, which require a smooth high quality surface, which is exceptionally hard. By the term solvent free, it is meant that the compositions of the present invention completely react in the mold to a hard solid with no volatiles. Exemplary applications include automotive grill and headlight assemblies, appliance and electrical housings and components, food trays, and sanitary ware. The invention is particularly advantageous for use in the manufacture of sanitary ware such as sinks, shower stalls, bath tubs, counter tops, etc., wherein a clear, non-discoloring high quality surface which exhibits exceptional hardness and tenacious adhesion to a molded plastic substrate is desired. Generally, the present invention achieves a cross-hatch adhesion rating to an FRP substrate indicating less than 10 percent, preferably, less than 5 percent, and most preferably less than 2 percent delamination.

The coatings for sanitary ware also have good resistance to hot water (as shown in Table II), as well as to common household stains. Another advantage of the coatings is good resistance to fluorescent-, sun—and UV-lights.

The invention will be better understood by reference to the following examples wherein in parts noted are parts by weight unless otherwise indicated.

TABLE I

EXAMPLES
COMPOSITION OF CLEAR, HIGH HARDNESS, IMC

| Ingredient | Parts |
| --- | --- |
| EBECRYL 8301[1] | 75 |
| EBECRYL 284[2] | 25 |
| ROCKRYL 410[3] | 20 |
| RSX-88221[4] | 10 |
| Styrene | 18 |
| 2% BQ in Styrene | 7 |
| Zinc Stearate | 1.85 |
| Calcium Stearate | 0.45 |
| Co-Hex-Cem (Accelerator) | 0.15 |
| Cab-o-Sil M-5 | 3.0 |
| TBPB (t-butyl perbenzoate) | 1.0 |
| Total | 161.45 |

[1] Aliphatic hexafunctional urethane acrylate (RadCure).
[2] Aliphatic urethane diacrylate, diluted with 12% hexanediol acrylate (RadCure).
[3] Hydroxypropyl methacrylate (Rohm and Haas).
[4] Acrylate type adhesion promoter (RadCure). Recently product definition was changed by the manufacturer to RSX-92604.

A composition in accordance with the invention was prepared by blending the ingredients in the sequence listed in Table I, using a mixer with vacuum attachment for degassing (Wip Mix Vac-U-Mixer Model D; Wip Mix Corp.). After thoroughly blending the ingredients shown in Table I, the gel time was determined and the liquid mixture was poured onto a freshly cured FRP sheet which was still hot in the mold at about 150° C. The hot mold was closed and opened again after one minute.

The cured coating was tested for: pencil hardness in accordance with ASTM-D 3363-92a; scalpel adhesion in accordance with a procedure adapted by GenCorp, cross-hatch adhesion in accordance with Ford Paint Adhesion Test FLTMB1.17-1; ultraviolet resistance in accordance with ASTM-D 2565-92a; and hot water resistance in accordance with a test procedure adapted by GenCorp. Briefly, the scalpel adhesion test is performed by cutting across the coated surface at a 30° C. angle into the substrate, and judging the quality of adhesion under a microscope (enlargement of 10x). Scalpel adhesion was judged on a pass, marginal, or fail criteria. The hot water resistance test was preformed by submerging rectangular in-mold coated FRP samples into hot water maintained at 90° C., and by visually judging surface integrity and color differences after 24 hours.

Properties of the cured in-mold coating composition of the example are shown in Table II.

TABLE II

PROPERTIES OF CLEAR IMC

Cure Characteristics

| | |
|---|---|
| Gel Time (200° F. bath): | ~8 minutes |
| Cure Time (300° F.): | 1 minute |

Coating Properties

| | |
|---|---|
| Substrate Used: | SMC 7170 (cured 45 seconds @ 300° F.) |
| Surface Appearance: | Smooth, glossy, no cracking or blistering |
| Cross-Hatch Adhesion Rating: | 0 (0–1% delamination) |
| Scalper Adhesion: | Pass |
| Pencil Hardness: | Passes 5H |
| Hot Water Soak (90° C., 400 Hrs.): | No blistering or delamination |
| UV Resistance (Xenon Arc, 200 Hrs.): | Virtually no discoloration |

Examples demonstrating the effect of an adhesion promoter with respect to adhesion are set forth in Table III.

TABLE III

| IMC Formulation: | 1 (Control) | 2 | 3 |
|---|---|---|---|
| EBECRYL 8301 | 150 | 150 | 150 |
| EBECRYL 284 | 150 | 150 | 150 |
| Styrene | 54 | 54 | 54 |
| m-TMI | 0 | 2.5 | 5 |
| 2% BQ 2% in Styrene | 2.1 | 2.1 | 2.1 |
| CO-Hex Cem | 0.15 | 0.15 | 0.15 |
| Zn Stearate | 1.85 | 1.85 | 1.85 |
| Calcium Stearate | 0.45 | 0.45 | 0.45 |
| Talc | 100 | 100 | 100 |
| Silica | 5 | 5 | 5 |
| t-Butylperbenzoate | 2.5 | 2.5 | 2.5 |
| Cured on FRP 80 sec./315° F. | | | |
| Crosshatch Adhesion Properties: | | | |
| Left/Right* | 9/8 | 0/0 | 1/0 |
| Center/Right* | 10/8 | 0/0 | 0/0 |
| Left/Center* | 9/10 | 0/0 | 1/0 |
| % Area of Adhesion Failure: (Left/Center/Right)* | 86/100/64 | 0/0/0 | 1/0/0 |

*Location on coated FRP sheet.
+) Rating on a scale of 0–10. 0 is best and 10 is worst.

Table III shows that adhesion is very good with 2.5 and 5 parts m-TMI; very poor without m-TMI (Cytec Industries Inc.).

The pencil hardness variation with respect to the ratio of hexafunctional polyurethanes versus difunctional polyurethanes is set forth in Table IV.

TABLE IV

| IMC Formulate | 1 | 2 | 3 (Control) |
|---|---|---|---|
| EBECRYL 8301 | 61.4 | 30.8 | 0 |
| EBECRYL 284 | 61.4 | 91.8 | 122 |
| RSX-92604 | 12 | 12 | 12 |
| ROCKRYL 410 | 24.5 | 24.5 | 24.5 |

TABLE IV-continued

| IMC Formulate | 1 | 2 | 3 (Control) |
|---|---|---|---|
| Styrene | 12.5 | 12.5 | 12.5 |
| BQ (2% in Styrene) | 17 | 17 | 17 |
| Co-Hex-Cem | 0.2 | 0.2 | 0.2 |
| Zn-Stearate | 2.3 | 2.3 | 2.3 |
| Calcium Stearate | 0.6 | 0.6 | 0.6 |
| Silica (Cabot M-5) | 7.3 | 7.3 | 7.3 |
| Cured on FRP 45 sec./315° F. | | | |
| Pencil Hardness | 5H | 4H | 3H |
| Crosshatch Adhesion | 0 | 0 | 0 |

While in accordance with the patent statutes the best mode and preferred embodiment has been set forth, the scope of the invention is not limited thereto, but rather by the scope of the attached claims.

What is claimed is:

1. A thermosettable in-mold coating composition, comprising:
   (a) at least one urethane polyacrylate having three or more terminal acrylate or methacrylate groups,
   (b) at least one (i) a urethane diacrylate having two terminal acrylate or methacrylate groups or (ii) a urethane divinyl compound having two terminal vinyl groups or (iii) combinations thereof, the mole ratio of said (b) component to said (a) component being from about 0.1 to about 100,
   (c) from about 2 to about 100 parts by weight of at least one ethylenically unsaturated copolymerizable monomer per 100 parts by weight of said (a) and (b) components, and
   (d) from about 2 to about 50 parts by weight of at least one adhesion promoter per 100 parts by weight of said a) and (b) components, said adhesion promoter being a vinyl substituted monoisocyanate, an alkyl cyanoacrylate wherein said alkyl group has from 1 to 10 carbon atoms, or a blend of an alkyl (meth)acrylate oligomer and at least one acrylate monomer.

2. A thermosettable in-mold coating composition according to claim 1, wherein the pencil hardness of said composition upon cure is at least 3 H.

3. A thermosettable in-mold coating composition according to claim 1, wherein the amount of said ethylenically unsaturated copolymerizable monomer is from about 5 to about 40 parts by weight per 100 parts by weight of said and (b) components, wherein said (b)/(a) mole ratio is from about 0.15 to about 15, wherein the amount of said adhesion promoter is from about 2 to about 45 parts by weight per 100 parts by weight of said (a) an (b) components, wherein said urethane polyacrylate is a urethane hexaacrylate containing isocyanurate rings therein, wherein said urethane diacrylate is an alkylene oxide-urethane reacted with a hydroxy alkyl (meth)acrylate, wherein said adhesion promoter is said blend of said alkyl (meth)acrylate oligomer and said acrylate monomer, and wherein said ethylenically unsaturated copolymerizable monomer is a vinyl substituted aromatic having from 8 to 12 carbon atoms, an alkyl (meth)acrylate wherein said alkyl has from 1 to 8 carbon atoms, or a hydroxyl alkyl (meth)acrylate wherein said alkyl has from 1 to 10 carbon atoms.

4. A thermosettable in-mold coating composition according to claim 3, wherein said composition contains less than 10 parts by weight of opacifiers per 100 parts by weight of said polymerizable monomers and oligomers, and wherein the pencil hardness of said composition upon cure is at least 3.5 H.

5. A thermosettable in-mold coating composition according to claim 3, wherein said urethane diacrylate comprises an (ethylene oxide/diethylene oxide) urethane diacrylate, and wherein said adhesion promoter oligomer has a number average molecular weight of from about 1,000 to about 5,000.

6. A thermosettable in-mold coating composition according to claim 4, wherein said composition is free of opacifiers and wherein said pencil hardness is at least 4.0 H.

7. A thermosettable in-mold coating composition according to claim 6, wherein said urethane diacrylate comprises an (ethylene oxide/diethylene oxide) urethane diacrylate, wherein said adhesion promoter oligomer has a number average molecular weight of from about 1,000 to about 5,000, and wherein said ethylenically unsaturated copolymerizable monomer is said hydroxy alkyl methacrylate or styrene.

8. A laminate, comprising, a thermoset fiber reinforced plastic substrate and a cured in-mold coating on at least a portion of said substrate, said in-mold coating comprising the reaction product of (a) at least one urethane polyacrylate having three or more terminal acrylate or methacrylate groups, (b) at least one urethane diacrylate having two terminal acrylate or methacrylate groups, or at least one urethane divinyl compound having two terminal vinyl groups, or combinations thereof, (c) at least one ethylenically unsaturated copolymerizable monomer, the amount of said ethylenically unsaturated copolymerizable monomer being from about 2 to about 100 parts by weight per 100 parts by weight of said (a) and (b) components, and (d) from about 2 to 50 parts by weight of an adhesion promoter per 100 parts by weight of said (a) and (b) components, said adhesion promoter being a vinyl substituted monoisocyanate, an alkyl cyanoacrylate wherein said alkyl group has from 1 to 10 carbon atoms, or a blend of an alkyl (meth)acrylate oligomer and at least one acrylate monomer, wherein the mole ratio of said (b) component to said (a) component is from about 0.1 to about 50, and wherein said in-mold coating has a pencil hardness of at least 3.0 H.

9. A laminate according to claim 8 wherein said urethane polyacrylate is a urethane hexaacrylate containing isocyanurate rings therein, and wherein said urethane diacrylate is an alkylene oxide-urethane reacted with a hydroxy alkyl (meth)acrylate.

10. A laminate according to claim 9, wherein said pencil hardness is at least 4.0 H and wherein said in-mold coating composition contains less than 5 parts by weight of opacifiers per 100 parts by weight of said polymerizable monomers and oligomers.

11. A laminate according to claim 8, wherein said in-mold coating has a pencil hardness of at least 3.25 H.

12. A laminate according to claim 9, wherein said urethane diacrylate comprises an (ethylene oxide/diethylene oxide) urethane diacrylate, and wherein said adhesion promoter oligomer has a number average molecular weight of from about 1,000 to about 5,000.

13. A laminate according to claim 10, wherein said urethane diacrylate comprises an (ethylene oxide/diethylene oxide) urethane diacrylate, wherein said adhesion promoter oligomer has a number average molecular weight of from about 1,000 to about 5,000, and wherein said ethylenically unsaturated copolymerizable monomer is said hydroxy alkyl methacrylate or styrene.

* * * * *